Patented Apr. 13, 1937

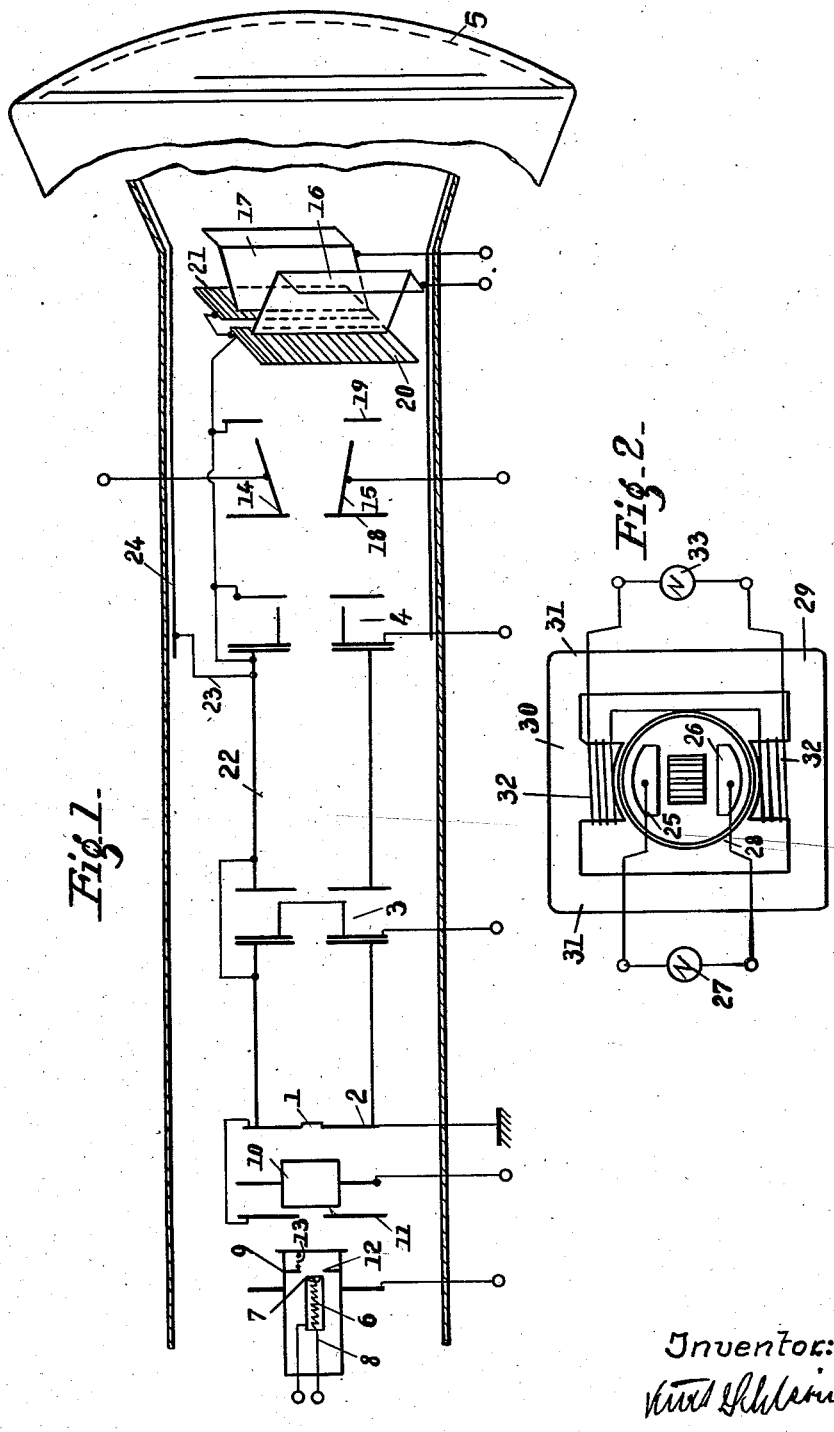

2,077,272

UNITED STATES PATENT OFFICE 2,077,272

BRAUN TUBE

Kurt Schlesinger, Berlin, Germany

Application July 6, 1934, Serial No. 733,995
In Germany July 8, 1933

5 Claims. (Cl. 250—27.5)

In the application Ser. No. 730,111 filed June 11th, 1934, there is described a cathode ray tube for television purposes operating under high vacuum, in which the electronic ray is controlled in its intensity, preferably by space charge control, and is preliminarily concentrated by the use of suitable electrostatic fields, or if desired also by the use of intermediate diaphragms, and projected on to a diaphragm. The aperture of this diaphragm is then reproduced on the luminous screen of the Braun tube by an electron-optical system having a constant focal distance.

Since the diaphragm aperture acts as a surface of constant form and size but with varying light intensity, it is possible in this manner to produce image points, the form and size of which is independent of their intensity and in consequence remain unaltered even when a change-over takes place from lightest white to deepest black. In this manner the errors in light control are obviated without the use of gas concentration solely by electrostatic devices which act as lenses. The present invention relates to a technical form of embodiment of a tube of this nature, in which preferably two electrostatic lenses and one condenser are employed.

Fig. 1 shows a section through the tube. A diaphragm aperture 1 in a plate 2 is employed as the object to be reproduced, and is reproduced on the screen 5 by means of two collecting lenses 3 and 4 disposed one behind the other. The diaphragm aperture 1, exactly as in the optical art, is reproduced in reverse form on the screen, enlarged in accordance with the ratio of the distance between the refractive plane and the screen 5 on the one hand and the refractive plane and the diaphragm 1 on the other hand. It is quite readily possible to impart to the fluorescent point any desired geometric form by giving the aperture 1 a corresponding shape. The practical dimensions are conveniently selected in such fashion that the reproduction takes place as far as possible merely with slight enlargement. The distance between the diaphragm 1 and the lens 4 should accordingly be as large as possible compared with the distance between 4 and 5. In practice the former may amount to 140 mm. and the latter to 250 mm., so that an enlargement takes place to merely approximately twice the size. The most extensive reduction possible of the reproduction of the diaphragm aperture on the screen should be sought to be obtained. This might be accomplished, for example, by shortening the distance between 4 and 5. To reduce still further the distance of the screen would be possible in itself, but would be accompanied by the disadvantage of a decreased sensitivity in the expanse of movement, so that with the same deflecting potentials the size would be smaller.

It has been found that difficulty exists in producing over such a great length of tube (for example 140 mm.) an electronic ray having the required density and such a small angle of divergence that the same at the point of the rear lens 4 still passes cleanly through the lens aperture. On the other hand no difficulties are encountered in making adjustment for a very considerable density of current at the point of the diaphragm 1 if the marginal rays of the outgoing bundle are permitted to have a greater divergence.

It has been found, however, in accordance with the invention, that in the case of a current density of 1 milliampere per mm.$^2$ at a diaphragm aperture 1 of .5 mm. diameter with the condenser arrangements and cathodes described more concisely in the following a cross-section of the bundle of less than approximately 10 mm.$^2$ is difficult to obtain at the point of the rear lens. If on the other hand an attempt is made to reduce the cross-section at that point, this can only be done if at the same time the rays impinging against 2 are made parallel, a large part of the energy being withheld in useless fashion from the diaphragm plate 2, this resulting in a considerable loss of light.

One object of the invention accordingly resides in the use of a second lens, i. e., the front lens 3. This lens 3 is approached to within a short distance, i. e., approximately half the length of the tube, towards the diaphragm 1. The same is so adjusted that the same alone is able to project on the screen merely a virtual image, and is so arranged between diaphragm and screen that its actual image of the diaphragm 1 is preferably smaller than or at the most equal to the cross-section of the bundle at the screen 5 determined by the opening of 4 and 1. It has been found that it is possible in ideal fashion, with the assistance of two lens devices of this kind connected one behind the other, to project an actual reversed image of the lens 1 without interfering coma, with a very high density of current up to 5 milliamperes per mm.$^2$ in the diaphragm 1, possibly with a somewhat greater enlargement than would take place with a single-lens tube having the lens 4 alone. The decisive advantage consists in the fact that at no point is energy lost by selection.

It is possible in this tube to reduce the disadvantage of excessively large image point, since owing to the greater concentration of the rays at the point 2 it is also possible to select there a smaller diaphragm aperture than in the case of lighting with parallel light. The degree of smallness of the diaphragm 1 without loss by selection depends on the size of the cathode and the embodiment of the condenser system, which has the object of reproducing the surface of the cathode on the diaphragm aperture. In Fig. 1 the cathode consists of a metallic sleeve 6, in the surface of which the oxide is pressed into a recess 7, and which is heated by a heating filament 8. The reproducing elements for the surface of the cathode are the cylinders 9 and 10 and the anodes 11 and 2. The small perforation grid 12, which is situated with 2 mm. aperture at a very short distance amounting to approximately .2 mm. in front of the cathode, which has an emissive surface of approximately 1.5 mm., serves the purpose of light control, which operates as so-called dark space control. The combination of a negatively biased cylinder 10 and an after-connected positive diaphragm 2 produces in the known manner a plane of refraction. The size of the cathode image on the anode 2 is all the smaller, the smaller the ratio between the diameter of the cathode 7 and the focus of the condenser lens 10/2. The greater the focal distance of the latter, however, the greater is the distance at which the luminous object 7 requires to be disposed from the location of the plane of refraction 10. A technical compromise leads to dimensions as follows: The distance 9—11 amounts to approximately 5 mm., the cylinder 10 to 10 x 10 mm., the distance 11—2 to approximately 20 mm. The scale of reproduction is then reduced approximately as 1:3, so that it is possible to pass the emission of a 1 mm. spot of oxide, which amounts to approximately 5 milliamperes, quite cleanly through a diaphragm .3 mm. in size.

The cylinder 9 also forms with the anode 11 a concentrating system, which at the same time accelerates. By selection of the potential at 11, and of the drop (i. e. the distance of the emissive surface from the plane of the opening of the cylinder 9) 13 for example at approximately 4 mm., with a diameter of cylinder amounting to 10 mm., it may be accomplished that the bundle of rays entering the lens 10 possesses an angle of divergence as small as desired. According to the invention, it is possible with the dimensions as stated to obtain parallel rays at the plane 11 if the anode 11 is linked up with the full anode potential of 2. The sensitivity of the light control amounts to approximately 7 volts; in this case the plate 11 and the cylinder 10 may be omitted and the plate 2 may be directly used in combination with the cylinder 9.

Particular care is required in the embodiment of the deflecting systems. There is shown in the drawing a double electrostatic deflection by means of the pairs of plates 14, 15 and 16, 17. According to a further object of the invention, the smallest spacing between these pairs of plates is made, equal to, or larger, but not appreciably smaller than the aperture of the rear lens. The length of the plates in the direction of the rays, in the case of parallel plates, according to the invention is determined by the maximum angle of movement, with desired size and spacing of the screen; i. e. the distance between the plates of each system is so dimensioned that the ray, when scanning the edges of the picture to be produced is almost striking against the respective edges of the respective deflecting plates. In this way it is possible to obtain the greatest possible sensitivity (mm. deflection per volt) of the deflecting systems. In the case of tilted plates the length may be somewhat greater than that of parallel plates. In the practical embodiment the spacing of the relatively tilted plates may amount for inlet and outlet to 7 and 15 mm., with a lens aperture of 7 mm. and length of plate in the direction of the rays amounting to 30 mm. An essential point is the choice of the distance between the plates 14, 15 on the one hand and the lens 4 and the front plates 16, 17 on the other hand. This distance shall preferably amount to at least twice the smallest distance which may happen to be between the plates. In the present case both distances amount to 30 mm., i. e., to four times the same. It is only in this manner that it is possible to avoid departure from the rectangular form of the image. At the same time the plates 16, 17 require to be very wide, and connection leads must be avoided in the direction of the field lines (infinitely long plates). An additional correction in form if necessary may be performed by the screens 18, 19, 20 and 21, which just overlap the edges of the plates, and are taken to earth. For the purpose of avoiding wall charges the neck of the tube is metallized for example silvered, viz., between the point of the lens 4, where the tubular portion 22 of approximately 15 mm. inner diameter terminates, and approximately the middle of the bulb. This wall coating 24 is earthed by means of leads 23. The complete structure of the tube is performed with the use of non-magnetic material, phosphor bronze and glass, with the assistance of special gauges, for example, in accordance with application Ser. No. 702,313. The tube operates absolutely correctly only if the same is surrounded according to a further object of the invention, with an outer protective jacket of sheet iron and in this manner protected against the effect of the earth field.

All deflecting plates may be passed out singly. In this manner the polarity of both image coordinates may be reversed. All disadvantages of the trapezium formation may also be avoided according to Fig. 2 by the use of mixed electromagnetic deflection. Fig. 2 represents a section through the neck of the tube viewed from above. The deflecting plates 23 and 24 are connected with the line frequency, and at the same time constructed as iron pole shoes. 25 is the line-frequency generator. On the outside of the glass wall 26 of the tube there are fitted pieces of iron 27 and 28, which are connected by a yoke 29 and carry a coil 30. The coil 30 is traversed by the anode current of a tilting potential amplifier tube, which is shown symbolically as generator 31 and provides an image-change frequency of approximately 25 periods. A ray passing vertically out of the plane of the paper is then deflected in both coordinates in the manner indicated. Electric and magnetic fields are congruent. There are then obtained in this way satisfactory image rectangles and, since the magnetic resistance is not great, adequate sensitivity in respect of the image deflection.

The magnet coil of the deflecting system, as shown in Fig. 2, may also be constructed in such fashion that the same consists of two high arches 29, and the coil of two halves, which are wound about the pole shoes.

The potentials for the single electrodes may conveniently be selected, for example, as follows: Cathode heating 8 4 volts, whereby the metal shoes 6 have zero potential, control potential at the Wehnelt cylinder −15 to 0 volts, i. e., $e_{go}=$ −7.5 volts, reproducing element 10 approximately 0–200 volts, anode 2 approximately 2,000 volts, front lens 3 and rear lens 4 approximately +1,000 volts, deflecting potentials $2e_k=800$ volts, on an average, therefore, ±400 volts.

The diaphragm 18 may either be raised to anode potential, i. e., separately from the pair of deflecting plates 14, 15 or, connected with the pair of deflecting plates, linked up with the tilting potential.

I claim:

1. A Braun tube for television purposes comprising an evacuated envelope enclosing an electron source consisting of an indirectly heated cathode, a Wehnelt-cylinder surrounding said cathode, a control electrode mounted within said cylinder in front of said cathode, and a plate shaped apertured anode mounted in front of said cylinder, means including said cathode and said anode for producing a cathode ray, said Wehnelt cylinder and said anode forming a pre-concentrating system for causing said cathode ray to pass said apertured anode with an opening angle of at most 7 degrees, a fluorescent screen, an electrostatical electron-optical system comprising a plurality of apertured electrodes, mounted between said anode and said screen, and deflecting means for deflecting the cathode ray in two directions perpendicular to one another for the purpose of scanning said screen.

2. A Braun tube for television purposes comprising an evacuated envelope enclosing an electron source consisting of an indirectly heated cathode, a Wehnelt-cylinder surrounding said cathode, a control electrode mounted within said cylinder in front of said cathode, and an apertured anode arranged in front of said cylinder, and a plate-shaped apertured anode mounted in front of said cylinder, means including said cathode and said anode for producing a cathode ray, said Wehnelt cylinder and said anode forming a preconcentrating system for causing said cathode ray to pass said apertured anode with an opening angle of at most 7 degrees, an apertured diaphragm mounted in front of said anode, a cylinder interposed between and aligned with said anode and said apertured diaphragm, said cylinder being adapted to be supplied with a potential which is lower than that of said anode, a fluorescent screen, an electrostatical electron-optical system comprising a plurality of apertured electrodes, said system producing on said screen a sharp image of said diaphragm aperture and being mounted between said anode and said screen, and deflecting means for deflecting the cathode ray in two directions perpendicular to one another for the purpose of scanning said screen.

3. A Braun tube for television purposes comprising an evacuated envelope enclosing an electron source, means including said electron source for producing a cathode ray, a diaphragm having a small aperture mounted in front of said electron source, said diaphragm being adapted to be supplied with a positive potential, a fluorescent screen, deflecting means for deflecting the cathode ray in two directions perpendicular to one another for the purpose of scanning the screen, one electron-optical system mounted between said electron source and said screen and producing an intermediate picture of said diaphragm aperture, and a further electron-optical system mounted between said first system and said screen, said further system reproducing said intermediate picture on said screen, each of said systems consisting of two apertured plates and a third element mounted between said plates and consisting of an apertured plate furnished at one side with a cylindrical abutment the diameter of which is considerably greater than the diameter of the aperture of the plate; and means for connecting each of the said plates with one another.

4. A Braun tube for television purposes comprising an evacuated envelope enclosing an electron source, means including said electron source for producing a cathode ray, a diaphragm having a small aperture mounted in front of said electron source, said diaphragm being adapted to be supplied with a positive potential, a fluorescent screen, deflecting means for deflecting the cathode ray in two directions perpendicular to one another for the purpose of scanning the screen, one electron-optical system mounted between said electron source and said screen and producing an intermediate picture of said diaphragm aperture, and a further electron-optical system mounted between said first system and said screen, said further system reproducing said intermediate picture on said screen, each of said systems consisting of two apertured plates and a third element mounted between said plates and consisting of an apertured plate furnished at one side with a cylindrical abutment the diameter of which is considerably greater than the diameter of the aperture of the plate, one metallic cylinder interposed between said diaphragm and said first electron-optical system, a further metallic cylinder interposed between said two electron-optical systems, the diameter of each of said cylinders being considerably greater than the diameter of each of said apertures and means for connecting each of the said plates with one another.

5. A Braun tube for television purposes comprising an evacuated envelope enclosing an electron source, means including said electron source for producing a cathode ray, a diaphragm having a small aperture mounted in front of said electron source, said diaphragm being adapted to be supplied with a positive potential, a fluorescent screen, deflecting means for deflecting the cathode ray in two directions perpendicular to one another for the purpose of scanning the screen, one electron-optical system mounted between said electron source and said screen and producing an intermediate picture of said diaphragm aperture, and a further electron-optical system mounted between said first system and said screen, said further system reproducing said intermediate picture on said screen, each of said systems consisting of two apertured plates and a third element mounted between said plates and consisting of an apertured plate furnished at one side with a cylindrical abutment the diameter of which is considerably greater than the diameter of the aperture of the plate; means for connecting each of the said plates with one another, and further means for connecting the said third elements with one another.

KURT SCHLESINGER.